United States Patent [19]

Kawabata

[11] Patent Number: 4,943,331
[45] Date of Patent: Jul. 24, 1990

[54] METHOD OF MANUFACTURING PNEUMATIC TIRE

[75] Inventor: Misao Kawabata, Tokorazawa, Japan

[73] Assignee: Bridgestone Corporation, Tokyo, Japan

[21] Appl. No.: 271,785

[22] Filed: Nov. 16, 1988

[30] Foreign Application Priority Data

Nov. 17, 1987 [JP] Japan ............................ 62-288289

[51] Int. Cl.$^5$ .................... B60C 9/18; B29D 30/20
[52] U.S. Cl. ................................. 156/129; 156/123
[58] Field of Search ............... 156/129, 130, 128.1, 156/126, 123

[56] References Cited

U.S. PATENT DOCUMENTS

| 4,007,069 | 2/1977 | Takayanagi et al. | 156/123 |
| 4,152,191 | 5/1979 | Olsen | 156/129 X |
| 4,308,083 | 12/1981 | Toth, Jr. | 156/129 |

FOREIGN PATENT DOCUMENTS 57-84835  5/1982  Japan ............................ 156/123

Primary Examiner—Merrell C. Cashion, Jr.
Assistant Examiner—Geoffrey Knable
Attorney, Agent, or Firm—Sughrue, Mion, Zinn, Macpeak & Seas

[57] ABSTRACT

To improve high speed durability or prevent tire ribs and/or blocks from being peeled off at high speed travel, a tread rubber member whose outer surface is formed into corrugation shape along tire axial direction, when seen in cross section, is prepared to form a green tire so that radially convex portions thereof may be located under tire circumferential grooves to be formed after vulcanization process and radially concave portions thereof may be located under tire ribs and/or blocks also to be formed after vulcanization process. Since the rubber flow rate of the tread rubber member under the circumferential grooves is relatively larger, when the green tire is vulcanized, the belt layers are conversely deformed into radially concave shape under the circumferential grooves. When the vulcanized tire is inflated with air or rotated at high speed, since the belt layers are returned to a flat shape and further the ribs and/or blocks are deformed into radially concave shape, it is possible to reduce a rise in temperature at the central portion of each of ribs and/or blocks.

12 Claims, 3 Drawing Sheets

METHOD OF MANUFACTURING PNEUMATIC TIRE

BACKGROUND OF THE INVENTION

1. Field of the Invention

The present invention relates to a method of manufacturing pneumatic tires, and more specifically to a method of manufacturing pneumatic radial tires of excellent speed durability in accordance with a simple and efficient manufacturing process.

2. Description of the prior Art

In pneumatic radial tires used for automotive vehicles, trucks, buses, etc., there exists no special difference in the tread contour and the belt structure between ordinary tires and ultra-high speed tires. For instance, the tread is formed with a plurality of circumferential grooves and lateral grooves so as to form ribs and/or blocks.

Further, the contour of the tread formed with ribs and/or blocks is usually formed into a circular arc shape, when seen in a cross-sectional view taken along a surface extending along a radial direction of a tire. Furthermore, the shape of the inextensible belt layer reinforced by metallic cords is also usually formed in the same shape substantially in parallel to the tire tread contour.

Conventionally, the pneumatic radial tires as described above are manufactured in accordance with process as shown in FIGS. 1(A), (B) and (C).

(1) With reference to FIG. 1(A), a carcass ply 2 is wound around a cylindrical former 1. Here, the carcass 2 is composed of one, two or three (at the most) rubber coated plies formed by arranging fiber cords (e.g. made of polyester, polyamide, rayon, aromatic polyamide, etc.) in a direction substantially in parallel to the rotary shaft of the former 1 (perpendicular to the tire equatorial plane).

Thereafter, two bead rings 3 are set to both sides of the former 1 coaxially with the former 1; two bead filler rubbers 4 are arranged on these two bead rings 3; both the ends of the carcass ply 2 are bent radially outward so as to wrap up the bead cores 3, respectively; and a pair of side rubbers 5 are attached to both the sides of the carcass ply 2, while leaving a space at the center of the carcass ply 2.

(2) With reference to FIG. 1(B), the carcass portion is expanded into a toroidal shape with a bladder press 6; and a belt member 7 and a tread rubber 8 are adhered onto the carcass ply 2 and between both the side rubbers 5.

Here, the belt layer 7 is formed by stacking a plurality of rubber coated layers in such a way that the arranged cords of different layers intersect each other. Each belt layer 7 is formed by arranging metal cords at a small inclination angle with respect to the tire circumferential direction. In this process, the belt layer 7 is first adhered onto the crown portion of the carcass ply 2 and then the tread rubber member 8 is adhered onto the belt layer 7, separately. Alternatively, first the belt layer 7 and the tread rubber member 8 are formed integral with each other, and then the two belt layer 7 and the tread rubber member 8 are adhered together onto the crown portion of the carcass ply 2.

Further, the tread rubber member 8 is composed of a main tread rubber member 8A (trapezoidal shape in cross section) of high abrasion resistance and two mini-skirt rubber members 8B made of material similar to the side rubber 5 and adhered to both sides of the tread rubber member 8A. However, it is also possible to form the tread rubber members 8A and 8B integral with each other. In this case, it is preferable that the radially outward ends of the side rubbers 5 are adhered so as to cover both the side ends of the tread member 8.

(3) With reference to FIG. 1(C), a stitching roller 9 is brought into contact with the side rubbers 5 to obtain a green tire 10 having a trapezoidal cross section such that the radially outermost end thereof is substantially flat.

(4) With reference to FIG. 2, a green tire 10 thus formed is put into a vulcanization mold (not shown) formed with ribs for making circumferential grooves and then vulcanized at high temperature and under high pressure as is usual, in order to obtain a pneumatic radial tire T as shown in FIG. 2. As depicted in FIG. 2, the pneumatic tire formed in accordance with the prior-art manufacturing method includes a carcass play 2, belt layers 7 formed on the carcass ply 2, and a tread rubber member 8 on which ribs and/or blocks 8C and circumferential grooves 8D are formed alternately.

In the pneumatic radial tire manufactured in accordance with the prior-art method and inflated under predetermined pressure, the contour of the tread rubber member 8 is formed as shown by solid lines in FIG. 2. No problem may arise when the tire is rotating at low speed or under the normal travel condition. However, when the tire is rotating at such a high speed as 200 to 300 km/h, the tread tends to expand radially outward, in particular the center of the ribs and/or blocks 8c project outward due to centrifugal force generated by the volume thereof as shown by dot-dashed line in FIG. 2.

When the radially outward surface of the tread expands at the center thereof, since the contact pressure against the ground locally increases excessively and further the tensile and compressive stress are repeated at the ribs or blocks, the temperature of the tread rubber member 8A rises and therefore the strength of the rubber drops sharply. That is, there exist a problem in that the ribs and/or blocks 8c of the tread are blow away or peeled off (so-called blown chunk-out). To overcome these problems, although it may be possible to use a rubber of high temperature resistance as the tread rubber member, it has thus far been difficult to obtain a satisfactory effect.

SUMMARY OF THE INVENTION

With these problems in mind, therefore, it is the primary object of the present invention to provide a method of manufacturing a pneumatic tire excellent in high speed durability in spite of a relatively simple method of manufacture.

To achieve the above-mentioned object, a method of manufacturing a pneumatic tire, according to the present invention comprises the following steps of: (a) winding a carcass ply around a cylindrical former; (b) adhering a pair of bead rings and a pair of bead filler rubbers on both side ends of the carcass ply; (c) adhering a pair of side rubbers on the bead filler rubbers, while leaving a space at a central portion of the carcass ply; (d) expanding the carcass ply on which bead rings, bead filler rubbers and side rubbers are arranged with a bladder press into a toroidal shape; (e) adhering a belt layer on the carcass ply; (f) adhering a tread rubber member whose outer surface is formed into a corrugation shape along the tire axial direction, when viewed in cross section, so that radially convex portions thereof may be located under tire circumferential grooves to be formed after vulcanization process and radially concave portion thereof may be located under tire ribs and/or blocks also to be formed after vulcanization process; (g) adhering both side ends of the tread rubber member to the side rubbers, respectively, with a stitching roller to obtain a green tire; and (h) placing the green tire into a mold for vulcanization, whereby radially concave belt layer portions can be formed just under the tire circumferential grooves and radially convex belt layer portions can be formed under the tire ribs and/or blocks before the tire is not yet inflated.

A height "h" of the corrugation on the outer surface of the tread rubber member lies preferably within a range from 0.5 to 3.0 mm between the radially concave and convex portions thereof. Further, the height of the corrugation is preferably the largest under the central rib and/or block and decreases from under the central rib and/or block to under side ribs and/or side blocks along the tire axial direction.

BRIEF DESCRIPTION OF THE DRAWINGS

The features and advantages of the method of manufacturing pneumatic tires according to the present invention over the prior-art method will be more clearly appreciated from the following description of the preferred embodiment taken in conjunction with the accompanying drawings in which.

DETAILED DESCRIPTION OF THE PREFERRED EMBODIMENTS

The method of manufacturing pneumatic tires according to the present invention will be described hereinbelow in detail.

Figure 3:
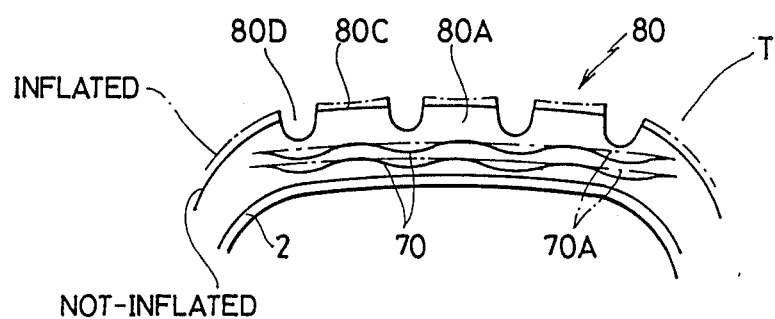
FIG. 3 is a cross-sectional view showing the tread of the pneumatic radial tire manufactured by the method of the present invention.

The feature of the method of the present invention is to prepare a tread rubber member 80 formed with a radially outer corrugation surface (i.e., upper portion as viewed in FIG. 4) to be brought into contact with the belt layer 7. When the corrugated tread rubber member 80 is used, it is possible to obtain a radial tire as shown in FIG. 3.

The method of manufacturing the pneumatic radial tire according to the present invention will be described in further detail with reference to FIGS. 1(A) and 1(C) (same process as in the prior-art method) and FIG. 4 (different process from the prior art method)

Figure 1A:
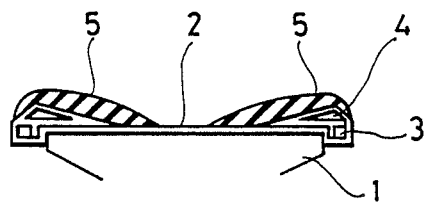
FIGS. 1(A) to (C) are cross-sectional views of tire members, for assistance in explaining a prior-art method of manufacturing a pneumatic radial tire.

1) In the same way as in the prior-art method shown in FIG. 1(A), a carcass ply (or plural carcass plies 2) is wound around a cylindrical former 1; two bead rings 3 are set to both sides of the former 1 coaxially with the former 1; two bead filler rubbers 4 are adhered onto these two bead rings 3; both the ends of the carcass ply 2 are bent radially outward to wrap up the bead rings, respectively; and a pair of side rubbers 5 are adhered to both sides of the carcass ply 2, while leaving a space at the center of the carcass play 2.

Figure 1B:
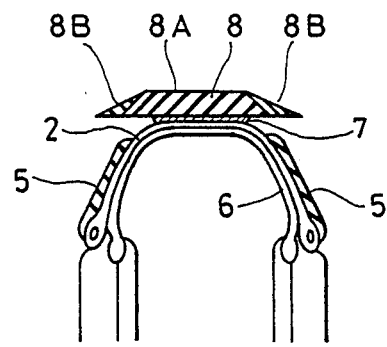
Figure 4:
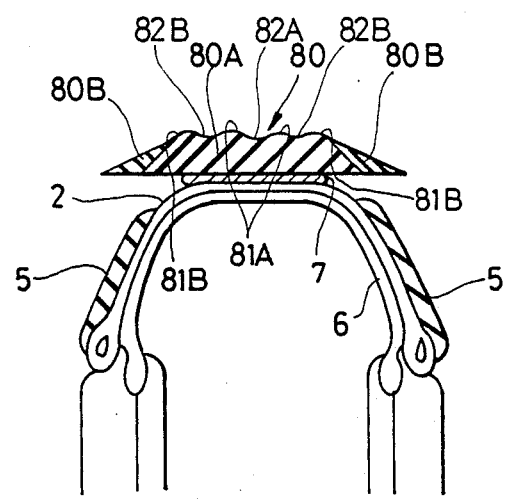
FIG. 4 is a view similar to FIG. 1(B) for assistance in explaining the feature of the method of the present invention.

(2) The difference from the prior-art method shown in FIG. 1(B), as shown in FIG. 4, is that the carcass portion is expanded into a toroidal shape with a bladder press 6; and a belt layer 7 and a tread rubber member 80 are adhered onto the carcass ply 2 and between both the side rubbers 5.

It should be noted that although both the belt layer 7 and tread rubber member 80 are integrally formed with each other, which is separated from the manufacturing process of the carcass ply 2, and thereafter adhered to the carcass ply 2 in the preferred embodiment, alternatively the belt layer 7 may be adhered to the carcass ply 2 and subsequently the tread rubber member 80 may be adhered to the belt layer 7 located on the carcass ply 2.

Figure 5:
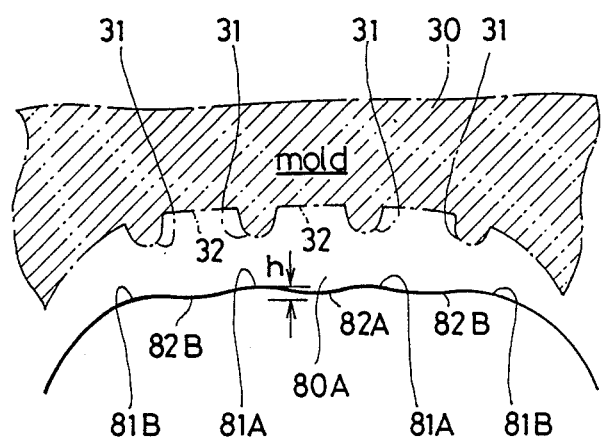
FIG. 5 is a phantom cross-sectional view showing a tread rubber member to be prepared for the method of the present invention in relative to a phantom position of a vulcanization die.

The tread member 80 may be composed of a main tread rubber member 80A (trapezoidal shape in cross section) of high abrasion resistance and two miniskirt rubbers 80B made of material similar to the side rubber 5 and adhered to both sides of the tread rubber 80A. Here, it should be noted that the radially outer surface of the main tread rubber member 80A is formed into a corrugation shape along the tire axial direction, when seen in cross section, as depicted in FIG. 4, in such a way that the radially convex portions 81A thereof which extend in the circumferential direction may be located under projections 31 of a vulcanization mold 30 and radially concave portions 82A thereof may be located under the flat portions 32 of the vulcanization mold 30, when the green tire is put into the vulcanization mold 30, as depicted in FIG. 5.

The height "h" of the corrugation formed on the outer surface of the tread rubber member 80A lies within a range from 0.5 to 3.0 mm, and more preferably from 1.0 to 2.0 mm. Further, where the number of tire circumferential grooves 80D is three or more, it is preferable to determine the height h of the corrugation 81A near the tread center larger than that of the corrugation 81B near the tread side ends. Further, it is also possible to obtain the same effect of the present invention (described later in further detail) when the corrugation 81B is omitted on both tread side ends into flat conditions.

Figure 1C:
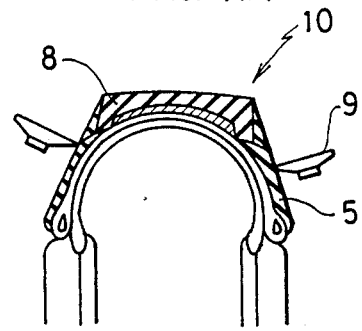

(3) In the same way as in the prior-art method shown in FIG. 1(C), a stitching roller 9 is brought into contact with the side rubbers 5 to obtain a green tire 10 having a trapezoidal cross section such that the radially outermost end thereof is substantially flat.

(4) Then, the green tire thus formed is put into a vulcanization mold 30 formed with projections 31 for obtaining circumferential grooves. In this case, the projections 81A of the tread rubber member 80A are aligned with the projections 31 of the mold 30. Thereafter, the green tire is vulcanized at high temperature and under high pressure as is usual in order to obtain a pneumatic radial tire T as shown in FIG. 3. As depicted in FIG. 3, the pneumatic tire formed in accordance with the method of the present invention includes a carcass ply 2, a corrugated belt layer 70 formed on the carcass ply 2, and a tread rubber member 80 on which ribs and/or blocks 80C and circumferential grooves 80D are formed alternately.

In the pneumatic radial tire manufactured in accordance with the method of the present invention, the belt layers 70 are corrugated and the contour of the tread 80 is formed flat as shown by solid lines in FIG. 3 when the tire is not yet inflated.

The reason why the cross-sectional view as shown by solid lines in FIG. 3 can be obtained before the tire is inflated will be explained hereinbelow.

As already described with reference to FIGS. 4 and 5, the radially outer surface of the tread rubber 80 or 80A is formed into a corrugated cross section to provide radially convex portions 81A at such positions as under projections 31 of the vulcanization mold 30. Therefore, when the tread rubber 80A is urged against the projections 31 of the mold 30 at high temperature under high pressure, the flow rate just under the projections 31 is greater than that under the mold flat surface 32.

As a result, the fluid tread rubber is quickly moved from under the mold projections 31 to under the mold surface 32 at relatively high flow rate. In other words, the belt layers 70 are formed to provide radially concave portions 70 just under the circumferential grooves 80D, as shown by solid lines in FIG. 3, when the green tire has been vulcanized but has not yet been inflated with air.

As described above, in the method of the present invention, it is very important to match the radially convex portions 81A of the tread rubber member 80A with the projections 31 of the mold 30 before or during vulcanization.

When the tire vulcanized as described above is inflated or rotated during high travel speed, the corrugated belt layers 70 and the tread contour are deformed as shown by dot-dashed lines in FIG. 3. That is, the corrugated belt layers 70 are deformed into the gently-curved flat belt layers 70A and the tread contour (the rib and/or block surface) 80C is deformed into radially convex shape as depicted by dot-dashed lines in FIG. 3. Therefore, when the tire is rotated at high speed, it is possible to reduce the pressure against ground at the central portion of each block. In other words, it is possible to reduce a rise in temperature at the blocks or to improve high speed durability while preventing blow chunk-out phenomenon. In this connection, the block ends can be cooled quickly than at the central portion thereof.

Test Results

To verify the effect of the present invention, a comparison test has been made between radial tires manufactured by the conventional method in which a trapezoidal (in cross section) tread rubber member as shown in FIG. 1(B) is used and those manufactured by the method in accordance with the present invention in which a trapezoidal (in cross section) tread rubber formed with a corrugated outer surface (h=1.5 mm) as shown in FIG. 4 is prepared.

The tire size was 235/45 VR 17. The belt layers were two cap plies in which two steel belt layers were formed by arranging steel cords at an inclination angle with respect to the tire circumferential direction and nylon cords were arranged in parallel to the tire circumferential direction.

Figure 2:
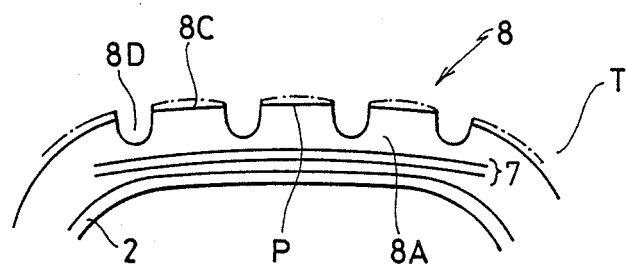
FIG. 2 is a cross-sectional view showing the tread of the pneumatic radial tire manufactured by the prior-art method shown in FIGS. 1(A) to (C)

Tire ground pressure was measured at a central position P of the block (shown in FIG. 2) with a 5-mm dia. pressure sensor under the condition that the test drum diameter was 3 m; the load was 350 kg; the inflation pressure was 2.8 kg/cm$^2$; and the rim size was 8×17.

The ground pressures of the tires manufactured by the prior-art method and the invention method are listed in table below, in which the ground pressures of the invention tires are indicated as indices when those of the prior-art tires are indicated as 100. In this representation method, the smaller the index, the higher the high speed durability.

TABLE

| SPEED (km/h) | Prior Art | Invention |
| --- | --- | --- |
| 50 | 100 | 90 |
| 150 | 100 | 75 |
| 200 | 100 | 75 |
| 250 | 100 | 70 |
| 300 | 100 | 70 |

The above table indicates that the ground pressure at the center of each block of the tires manufactured in accordance with the present invention is smaller than that of the tires manufactured by the prior art method at each vehicle speed, so that it is possible to improve high speed durability.

As described above, in the pneumatic radial tire manufactured by the method of the present invention invention, a trapezoidal (in cross section) tread rubber 80A formed with a corrugated outer surface is prepared, instead of that formed with a flat inner surface; and the radially convex portions 81A are arranged just under the projections 31 of the vulcanization mold 30. Therefore, after the green tire has been vulcanized, it is possible to obtain the belt layers deformed into a radially concave shape just under the circumferential grooves 80D. Therefore, when the tire is inflated with air or rotated at high speed, the belt layers are returned to substantially the same shape as the tread, and further the ribs and/or blocks 80C are deformed into radially convex shape. Under these conditions, since the ribs and/or blocks are mainly brought into contact with the ground on both the side ends thereof, it is possible to reduce the ground pressure or load applied to the central portions of the ribs and/or blocks. Since the side ends of the ribs and/or blocks can be more effectively cooled than at the center thereof, it is possible to prevent blow chunk-out of the tread rubber due to high temperature, and therefore improve high speed durability.

Further, in the method of the present invention, since the above-mentioned effect can be attained by simply modifying the shape of the tread rubber member without changing the prior-art apparatus and material, it is possible to simply and economically provide a novel method of manufacturing pneumatic radial tires of high speed durability.

What is claimed is:
1. A method of manufacturing a pneumatic tire, which comprises the following steps of:
    (a) winding a carcass ply around a cylindrical former;
    (b) adhering a pair of bead rings and a pair of bead filler rubbers on both side ends of the carcass ply;
    (c) adhering a pair of side rubbers on the bead filler rubbers, while leaving a space at a central portion of the carcass ply;
    (d) expanding with a bladder press the carcass ply on which bead rings, bead filler rubbers and said rubbers are arranged into a toroidal shape;
    (e) adhering a belt layer on the carcass ply;
    (f) preparing a tread rubber member whose outer surface is formed into a corrugated profile along a tire axial direction, in cross section, so that radially convex portions thereof are located under radially inward projections on the interior surface of a mold for vulcanization and radially concave portions thereof are located under flat portions of the interior surface of said mold for vulcanization when a green tire is placed in said mold;

(g) adhering the tread rubber member on to the belt layer;

(h) adhering both side ends of the tread rubber member to the side rubbers, respectively, with a stitching roller to obtain a green tire; and (i) placing the green tire into said mold for vulcanization, and aligning said radially convex portions of the corrugated profile of the tread rubber member with projections formed in a mold for forming circumferential grooves of a tire tread whereby radially concave belt layer portions are formed under the tire circumferential grooves and radially convex belt layer portions are formed under the tire projections before the tire is inflated.

2. The method of claim 1, where the height of the corrugated profile between the radially concave and convex portions thereof the outer surface of the tread rubber member lies within a range from 0.5 to 3.0 mm.

3. The method of claim 1, wherein the height of the corrugated profile is the largest under a projection in the crown portion of the tread and decreases to under a projection in the tire axial direction.

4. The method of claim 1 wherein said projections comprise a rib pattern in said tread rubber.

5. The method of claim 1 wherein said projections comprise a block pattern in said tread rubber.

6. The method of claim 1 wherein said projections comprise a combination rib and block pattern in said tread rubber.

7. A method of manufacturing a pneumatic tire comprising the steps of: winding a carcass ply around a cylindrical former; adhering bead rings, bead filler rubbers, and side rubbers on both side ends of the carcass ply; expanding the carcass ply with a bladder press into a toroidal shape; adhering a belt layer on the carcass ply; adhering a tread rubber member onto the belt layer; adhering both side ends of the tread rubber member to the side rubbers, respectively with a sticking roller to obtain a green tire; and placing the green tire into a mold for vulcanization, wherein the tread rubber member is formed into a corrugated profile along the tire axial direction, in cross section, on the outer surface thereof at positions such that radially convex portions thereof are located under radially inward projections on the inside surface of said mold for vulcanization and radially concave portions thereof are located under flat portions of said inside surface of said mold for vulcanization when said green tire is placed in said mold.

8. The method of claim 4 wherein the height of the corrugated profile between radially concave and convex portions thereof on the outer surface of the tread rubber member lies within a range of 0.5 to 3 mm.

9. The method of claim 4 wherein the height of the corrugated profile is the largest under a projection in the crown portion of the tread and decreases to under a projection in the tire axial direction.

10. The method of claim 4 wherein said projections comprise a rib pattern in said tread rubber.

11. The method of claim 4 wherein said projections comprise a block pattern in said tread rubber.

12. The method of claim 4 wherein said projections comprise a combination rib and block pattern in said tread rubber.

* * * * *